(12) United States Patent
Wang et al.

(10) Patent No.: US 7,965,838 B2
(45) Date of Patent: Jun. 21, 2011

(54) WATERMARK GENERATING CIRCUIT AND RELATED METHOD THEREOF

(75) Inventors: Yu-Min Wang, Hsin-Chu Hsien (TW); Tung-Lung Yu, Changhua County (TW)

(73) Assignee: Faraday Technology Corp., Science-Based Industrial Park, Hsin-Chu (TW)

( * ) Notice: Subject to any disclaimer, the term of this patent is extended or adjusted under 35 U.S.C. 154(b) by 872 days.

(21) Appl. No.: 11/947,797

(22) Filed: Nov. 30, 2007

(65) Prior Publication Data

US 2009/0141927 A1  Jun. 4, 2009

(51) Int. Cl.
H04N 7/167 (2006.01)
(52) U.S. Cl. ............... 380/200; 375/240.01; 382/100
(58) Field of Classification Search ............ 380/200
See application file for complete search history.

(56) References Cited

U.S. PATENT DOCUMENTS

| | | | | |
|---|---|---|---|---|
| 5,801,782 A * | 9/1998 | Patterson | 348/473 |
| 5,915,027 A * | 6/1999 | Cox et al. | 380/54 |
| 5,960,081 A * | 9/1999 | Vynne et al. | 713/176 |
| 6,037,984 A * | 3/2000 | Isnardi et al. | 375/240.21 |
| 6,185,312 B1 * | 2/2001 | Nakamura et al. | 382/100 |
| 6,226,387 B1 * | 5/2001 | Tewfik et al. | 382/100 |
| 6,240,121 B1 * | 5/2001 | Senoh | 375/130 |
| 6,266,419 B1 * | 7/2001 | Lacy et al. | 380/269 |
| 6,272,634 B1 * | 8/2001 | Tewfik et al. | 713/176 |
| 6,282,299 B1 * | 8/2001 | Tewfik et al. | 382/100 |
| 6,345,100 B1 * | 2/2002 | Levine | 380/205 |
| 6,374,036 B1 * | 4/2002 | Ryan et al. | 386/261 |
| 6,425,082 B1 * | 7/2002 | Matsui et al. | 713/176 |
| 6,477,431 B1 * | 11/2002 | Kalker et al. | 700/39 |
| 6,700,991 B1 * | 3/2004 | Wu et al. | 382/100 |
| 6,704,431 B1 * | 3/2004 | Ogawa et al. | 382/100 |
| 6,757,405 B1 * | 6/2004 | Muratani et al. | 382/100 |
| 6,785,401 B2 * | 8/2004 | Walker et al. | 382/100 |
| 6,792,542 B1 * | 9/2004 | Lee et al. | 726/1 |
| 6,996,248 B2 * | 2/2006 | Fudge et al. | 382/100 |
| 7,084,903 B2 * | 8/2006 | Narayanaswami et al. | 348/207.99 |
| 7,131,004 B1 * | 10/2006 | Lyle | 713/169 |
| 7,158,653 B2 * | 1/2007 | Fletcher et al. | 382/100 |
| 7,181,043 B2 * | 2/2007 | Iwamura | 382/100 |
| 7,336,802 B2 * | 2/2008 | Kunisa | 382/100 |
| 7,391,880 B2 * | 6/2008 | Reed et al. | 382/100 |
| 7,489,797 B2 * | 2/2009 | Izquierdo | 382/100 |
| 7,646,882 B2 * | 1/2010 | Muratani | 382/100 |
| 7,688,994 B2 * | 3/2010 | Yadid-Pecht et al. | 382/100 |

(Continued)

OTHER PUBLICATIONS

Ying-Hong Ke, Digital Watermarking based Key Distribution Method for Pay-TV System, Dissertation for Master of Philosophy, Jun. 2000, pp. 27-35, Department of Computer Science and Engineering, National Sun Yat-sen University, Kaohsiung, Taiwan.

*Primary Examiner* — Sath V Perungavoor
(74) *Attorney, Agent, or Firm* — Winston Hsu; Scott Margo (57) ABSTRACT

A watermark generating circuit includes: a first computing circuit, for generating a second reference signal according to a computing parameter, an input data and a first reference signal; a second computing circuit, coupled to the first computing circuit, for generating at least one selecting signal to determine an embedding location for a watermark according to the second reference signal; and a register, coupled to the first computing circuit, for registering the second reference signal to transmit the registered second reference signal to the first computing circuit for updating the first reference signal, and for generating the watermark according to the second reference signal.

18 Claims, 9 Drawing Sheets

U.S. PATENT DOCUMENTS

| | | | |
|---|---|---|---|
| 2002/0094082 A1* | 7/2002 | Jones et al. | 380/219 |
| 2002/0150247 A1* | 10/2002 | Linnartz et al. | 380/205 |
| 2002/0154778 A1* | 10/2002 | Mihcak et al. | 380/262 |
| 2002/0164046 A1* | 11/2002 | Walker et al. | 382/100 |
| 2003/0009671 A1* | 1/2003 | Yacobi et al. | 713/176 |
| 2003/0011684 A1* | 1/2003 | Narayanaswami et al. | 348/207.99 |
| 2003/0016756 A1* | 1/2003 | Steenhof et al. | 375/240.25 |
| 2003/0026422 A1* | 2/2003 | Gerheim et al. | 380/210 |
| 2003/0152225 A1* | 8/2003 | Kunisa | 380/210 |
| 2004/0042636 A1* | 3/2004 | Oh | 382/100 |
| 2004/0101160 A1* | 5/2004 | Kunisa | 382/100 |
| 2004/0120523 A1* | 6/2004 | Haitsma et al. | 380/239 |
| 2005/0262351 A1* | 11/2005 | Levy | 713/176 |
| 2006/0056653 A1* | 3/2006 | Kunisa | 382/100 |
| 2007/0019090 A1* | 1/2007 | Yadid-Pecht et al. | 348/308 |
| 2008/0226121 A1* | 9/2008 | Tewfik et al. | 382/100 |
| 2009/0141927 A1* | 6/2009 | Wang et al. | 382/100 |

* cited by examiner

WATERMARK GENERATING CIRCUIT AND RELATED METHOD THEREOF

BACKGROUND OF THE INVENTION

1. Field of the Invention

The present invention relates to a watermark generating circuit and a related method thereof, and particularly relates to a watermark generating circuit for a video encoder and a related method thereof.

2. Description of the Prior Art

Figure 1:
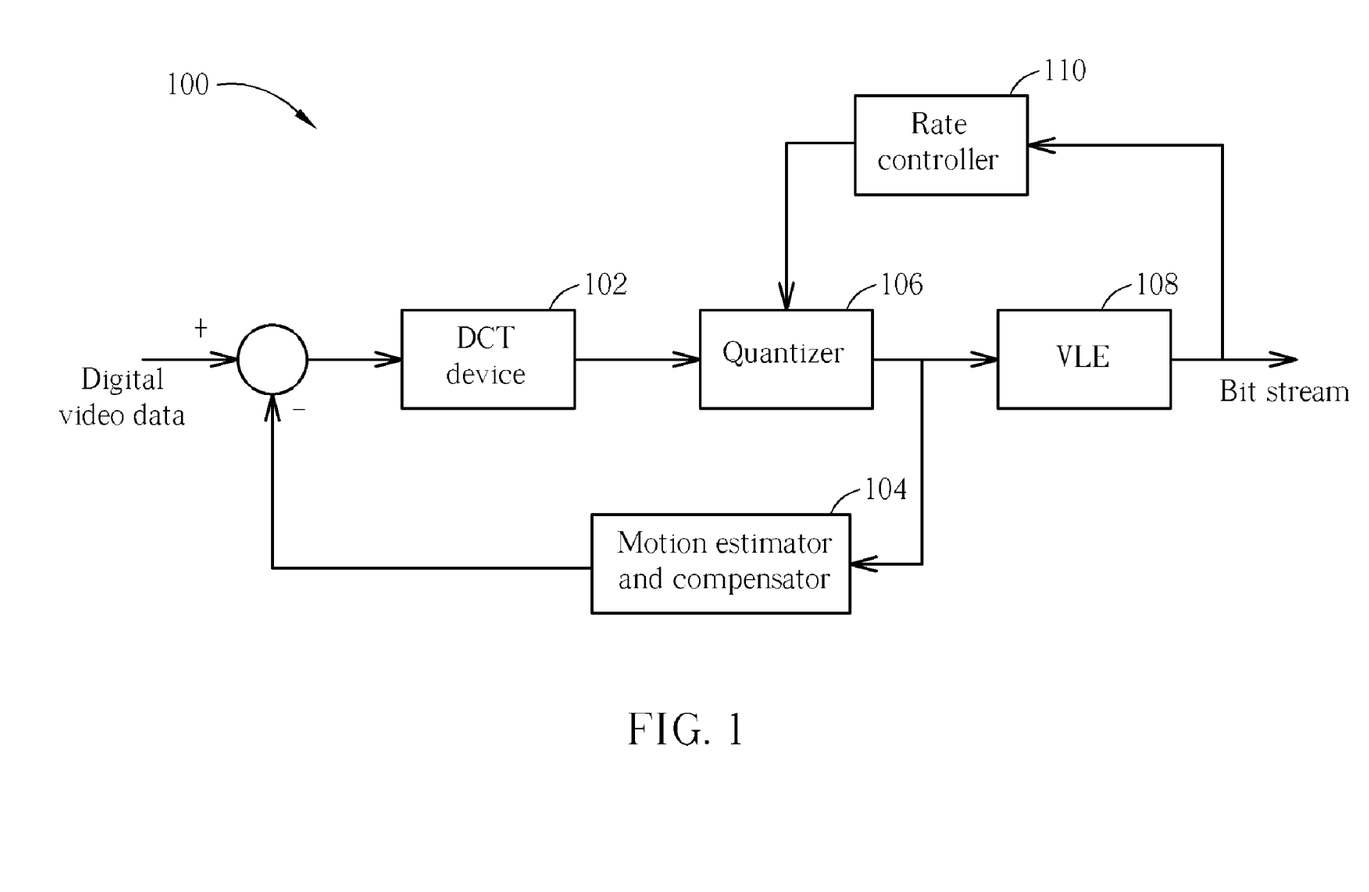
FIG. 1 is a block diagram illustrating a prior art video encoder.

FIG. 1 is a block diagram illustrating a prior art video encoder 100. The video encoder 100 includes a DCT (discrete cosine transform) device 102, a motion estimator and compensator 104, a quantizer 106, a VLE (variable length encoder) 108 and a rate controller 110. The video encoder 100 utilizes a DCT device 102 and a quantizer 106 to estimate spatial redundancy information of a video frame, and utilizes the compensator 104 to estimate time redundancy information to compress video data. Finally, the data is encoded by the VLE 108 and transmitted to a system multiplexer (not illustrated), and outputs data via a transport stream or program stream following the MPEG2 standard.

In order to make sure that the image is correct, and not destroyed or distorted in transmission, the video encoder always adds a watermark for identifying data when it is encoded.

A digital watermark technique is a technique that embeds an invisible digital watermark to an image for protecting image or copyright, and can include three stages: digital watermark generation, digital watermark embedding stage, and extraction and verification of digital watermark stage. In the digital watermark generation stage, the user generates a digital watermark, which is always a binary image, or a random value that has an equivalent value of 0 and has normal distribution. In the digital watermark embedding stage, the user utilizes an embedding key to embed the digital watermark to an image to be protected. In the extraction and verification of digital watermark stage, the user utilizes an extraction key to extract the digital watermark from the image to be detected, and compare with another digital watermark. The comparison method and results are varied according to the utilization purpose.

Digital watermarks can be classified into robust type and fragile type. The robust type watermark can be embedded to images via specific techniques, and the existence thereof can be detected even after image processing, such that the copyright can be protected. However, a fragile type watermark embedded to an image will be destroyed if the image concept is varied, such that the completeness of the image can be identified via observing if the extracted watermark is complete. Also, the fragile type watermark has a characteristic that it can locate the destroyed region of the image. The image identification technique due to digital watermark can utilize an information hiding technique to embed the digital watermark into the frequency domain.

The above mentioned watermark technique can only utilize a specific key that is easily detected. Also, most watermark techniques can only be utilized to detect I frames but cannot be utilized to detect P frames or B frames. Also, many watermark techniques utilize complicated operation structures such as Lagrangian cost function or encoding methods such as a two pass encoding method, and thus are not convenient for hardware circuit implementation and real time encoding.

SUMMARY OF THE INVENTION

Therefore, one objective of the present invention is to provide a watermark generating circuit and related method thereof, such that the watermark can be continuously varied and the embedding location thereof can also vary according to image data, so the watermark will not be easily detected.

Another objective of the present invention is to provide a watermark generating circuit and related method thereof, which can imbed the watermark into a quantization coefficient that has less effect for P frames, such that a watermark can be embedded to a P frame without affecting the image quality.

One embodiment of the present invention discloses a watermark generating circuit, comprising: a first computing circuit, for generating a second reference signal according to a computing parameter, an input data and a first reference signal; a second computing circuit, coupled to the first computing circuit, for generating at least one selecting signal to determine an embedding location for a watermark according to the second reference signal; and a register, coupled to the first computing circuit, for registering the second reference signal to transmit the registered second reference signal to the first computing circuit for updating the first reference signal, and for generating the watermark according to the second reference signal.

The embodiment of the present invention also discloses a watermark generating method, which corresponds to the above mentioned circuit, comprising: (a) setting initial values of a first reference signal and a computing parameter; (b) generating a second reference signal according to the computing parameter, an input data and the first reference signal; (c) determining an embedding location for a watermark via generating at least one selecting signal according to the second reference signal; and (d) registering the second reference signal to utilize the registered second reference signal for updating the first reference signal, and generating the watermark according to the second reference signal.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the description and following claims to refer to particular components. As one skilled in the art will appreciate, electronic equipment manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Figure 2:
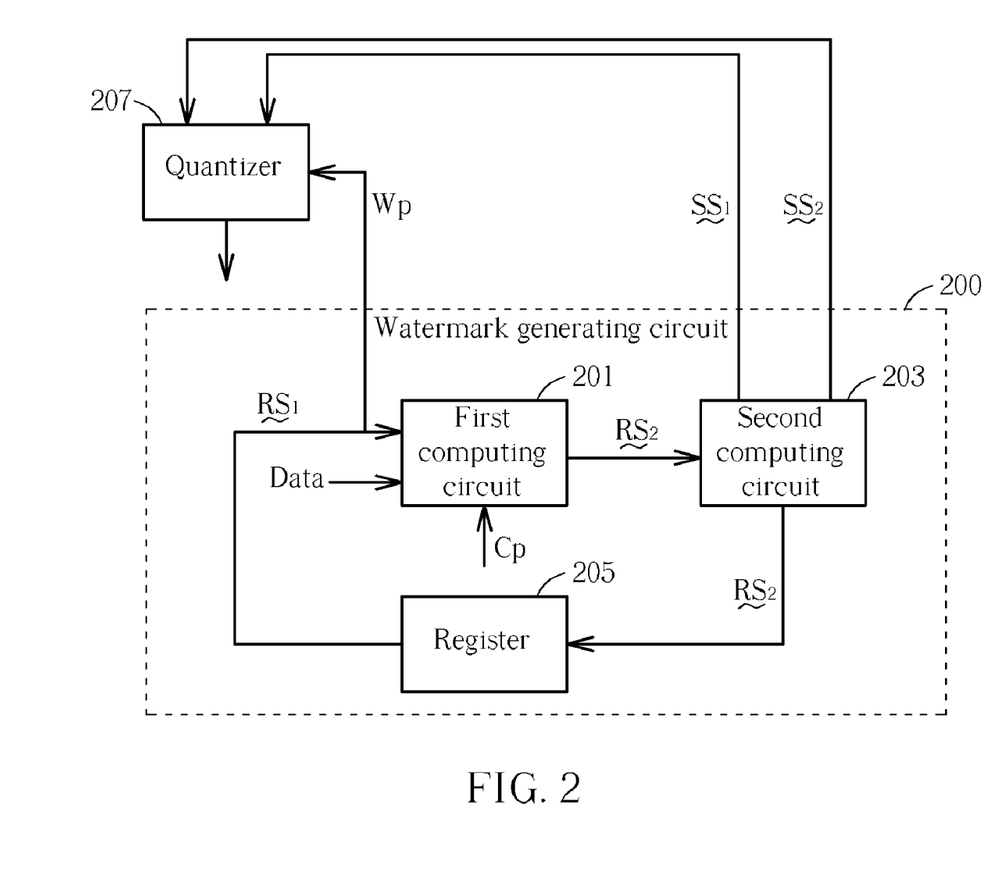
FIG. 2 is a block diagram illustrating a watermark generating circuit according to an embodiment of the present invention.

FIG. 2 is a block diagram illustrating a watermark generating circuit 200 according to an embodiment of the present invention. As shown in FIG. 2, the watermark generating circuit 200 includes a first computing circuit 201, a second computing circuit 203 and a register 205. The first computing circuit 201 is used for generating a second reference signal $RS_2$ according to a computing parameter CP, an input data Data and a first reference signal $RS_1$. The second computing circuit 203, which is coupled to the first computing circuit 201, is used for generating at least one selecting signal $SS_1$ and $SS_2$ to determine an embedding location for a watermark WP according to the second reference signal. The register 205, which is coupled to the first computing circuit 201, is used for registering the second reference signal $RS_2$ to transmit the registered second reference signal $RS_2$ to the first computing circuit 201 for updating the first reference signal $RS_1$, and for generating the watermark WP according to the second reference signal $RS_2$.

The whole operation of the watermark generating circuit can be summarized as follows: first, initial values of a first reference signal $RS_1$ and a computing parameter CP are set, wherein the operation of the computing circuit 201 is determined according to the computing parameter CP, and the initial first reference signal $RS_1$ is also utilized for an initial watermark WP. Then, the first computing circuit 201 utilizes the first reference signal $RS_1$ with the input data Data to generate the second reference signal $RS_2$, and the second computing circuit 203 generates the selecting signals $SS_1$ and $SS_2$ to determine an embedding location of the watermark. During the operation, since the input data Data may vary (the data can be generated from the watermark generating circuit 200 or other apparatus), the second reference signal $RS_2$ may also vary. Therefore, the second reference signal $RS_2$ is registered to the register 205 to avoid disturbance to the circuit due to the continuously varied second reference signal $RS_2$. Also, the latest second reference signal $RS_2$ is outputted to update the first reference signal $RS_1$ at a specific timing, then a new first reference signal $RS_1$ is utilized to generate a new second reference signal $RS_2$. Similar steps are performed repeatedly. According to the above-mentioned description, the first reference signal $RS_1$ and the computing parameter CP relate to parameters and embedding locations of the watermark WP, and initial values of the first reference signal $RS_1$ and the computing parameter CP are pre-determined. Therefore, the location and the concept of the watermark are hard to detect unless the initial values of the two parameters are obtained, thereby the data security is greatly increased via the mechanism disclosed in the present invention.

If the watermark generating circuit 200 is utilized for a video encoder, the input data Data can be a 32-bit bit stream from a VLE. Also, each bit of the watermark WP is transmitted to the quantizer 207 to be embedded to a quantization coefficient in a subblock of a macro block in a frame. The first computing circuit 201 is a 32-bit CRC circuit, the computing parameter CP includes a CRC coefficient, and the first and second reference signals $RS_1$ and $RS_2$ are both 32-bit CRC checksums. The first selecting signal $SS_1$ determines which subblock the watermark is embedded to, and the first selecting signal $SS_1$ is determined via the $24^{th}$ to $27^{th}$ bit of the second reference signal $RS_2$ (it is assumed that the bit number of the second reference signal $RS_2$ is from the $1^{st}$ bit to the $32^{nd}$ bit). Also, the second selecting signal $SS_2$ determines which quantization coefficient of the subblock the watermark is embedded to, and the second selecting signal $SS_2$ is determined via the $22^{nd}$ to $23^{rd}$ bit of the second reference signal $RS_2$ (it is assumed that the bit number of the second reference signal $RS_2$ is from the $1^{st}$ bit to the $32^{nd}$ bit). Also, the register 205 updates the latest second reference signal $RS_2$ to the first reference signal $RS_1$ after the encoder processes a full frame. It should be noted that the above-mentioned limitation is only an example and is not meant to limit the scope of the present invention. Persons skilled in the art can amend the devices and circuit operation under the concept of the present invention.

Figure 3:
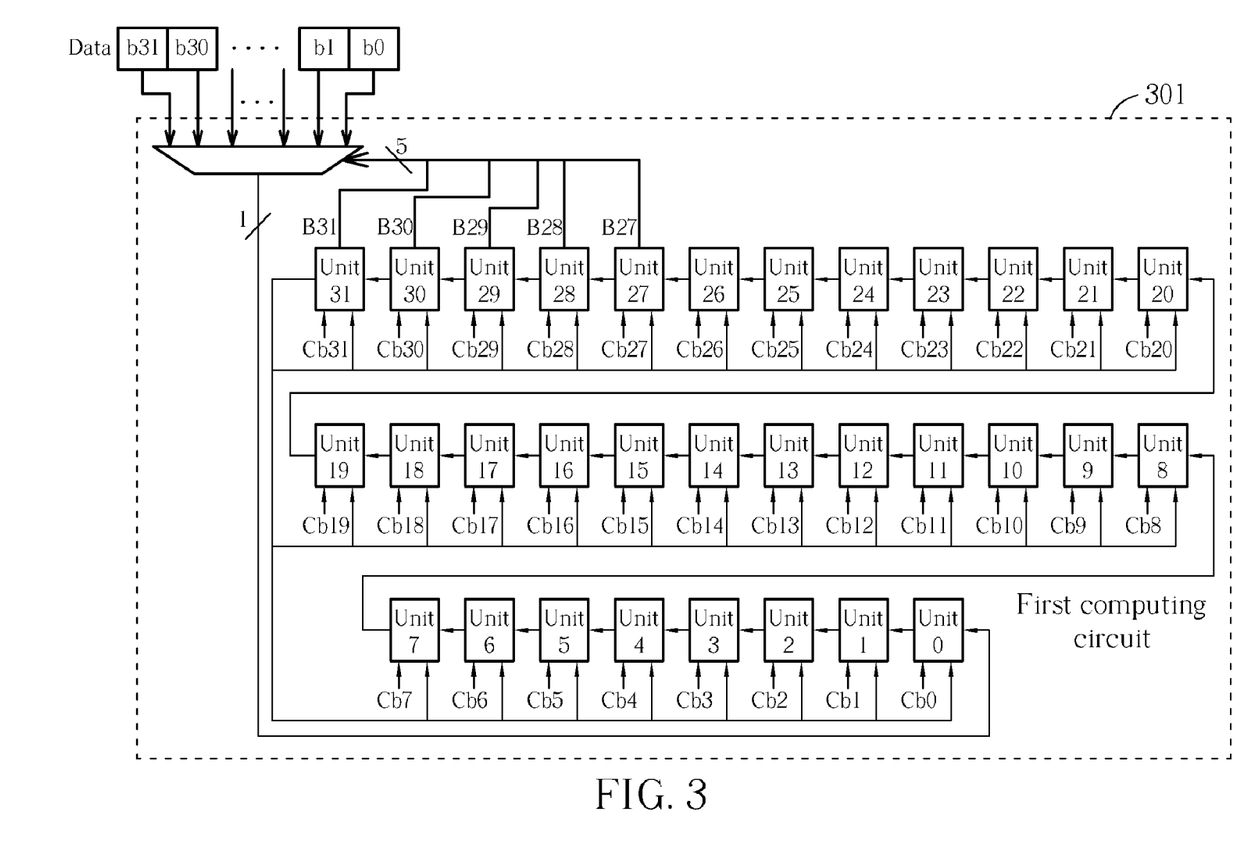
FIG. 3 is a schematic diagram illustrating the detailed structures of the first computing circuit in FIG. 2.

FIG. 3 is a schematic diagram illustrating detailed structures of the first computing circuit 301 in FIG. 2. In this case, the first computing circuit 301 is a 32-bit CRC circuit. As shown in FIG. 3, the first computing circuit 301 includes 32 CRC units Unit0~Unit31, and each CRC unit stores a bit of the first reference signal $RS_1$ and receives bits $C_{b0}$~$C_{b31}$ of the computing parameter CP. In this embodiment, a part of CRC units of the first computing circuit 301 receives part bits of the computing parameter CP to determine the operation thereof (in this case, the units Unit0~Unit26 receive the bits $C_{b0}$~$C_{b26}$), and other parts of the CRC units determine which bits of the input data Data (a 32-bit bit stream in this example) should enter the first computing circuit 301 for operation according to Unit31~Unit27 of the first computing circuit 301 (that is, part bits of the stored first reference signal $RS_1$). As described above, the first computing circuit 301 has different operations due to different computing parameters CP to generate different second reference signals $RS_2$. The input data Data continuously varies, and the part thereof, which is processed by the first computing circuit 301, also varies corresponding to different values of Unit 31~Unit 27 of the computing circuit. In this way, the probability for cracking the watermark largely decreases.

Figure 4:
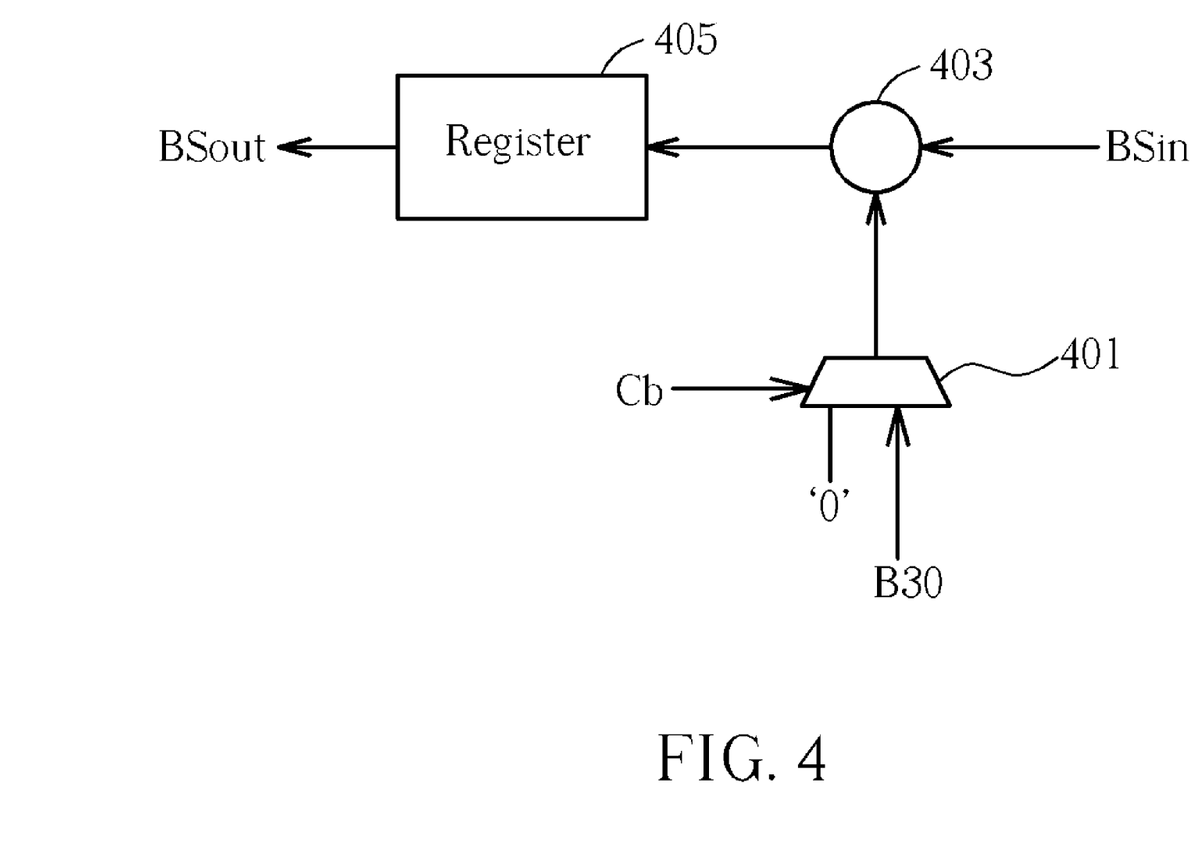
FIG. 4 is a circuit diagram illustrating the structures of each cyclic redundancy checking unit in FIG. 3.

FIG. 4 is a circuit diagram illustrating the structures of each cyclic redundancy checking unit in FIG. 3. As shown in FIG. 4, each CRC unit includes a multiplexer 401, an XOR unit 403 and a register 405, wherein the register 405 is utilized for registering bits of the first reference signal $RS_1$, and the multiplexer 401 determines operation of each CRC unit according to bits $C_{bn}$ of the computing parameter CP. It should be noted that the structure of the CRC circuit shown in FIG. 3 and FIG. 4 are only examples and are not meant to limit the scope of the present invention. Since the detailed structures and operation of the CRC circuit are well known by persons skilled in the art, they are omitted here for brevity.

Briefly, when the watermark generating circuit is utilized for a video encoder, the operation thereof can be summarized as follows: first, an initial value of the first reference signal RS1 (CRC check sum, also as an initial watermark WP) and an initial value of a computing parameter CP (CRC coefficient) are set. Part CRC units of the first computing circuit 201 (CRC circuit) receive the computing parameter CP and determine an operation mode of the first computing circuit 201, and another part of the first computing circuit 201 receives Unit 31~Unit 27 to determine which part of the input Data (a 32-bit bit stream from VLC) should enter the first computing circuit 201 for operation. Then the first computing circuit 201 utilizes the value of Unit 31~Unit 0 (that is, the first reference signal $RS_1$) of the first reference signal $RS_1$ with the input data Data to generate the second reference signal $RS_2$. The second computing circuit 203 generates the selecting signals $SS_1$ and $SS_2$ to determine an embedding location of the watermark according to part bits of the second reference signal $RS_2$. The register 205 registers the second reference signal $RS_2$ to avoid disturbance to the circuit due to the continuously varying second reference signal $RS_2$. Also, the registered latest second reference signal $RS_2$ is outputted to update the new reference signal $RS_1$ (that is, a new watermark WP) after the video encoder processes a full frame, and then the above-mentioned operations are repeated.

Figure 5:
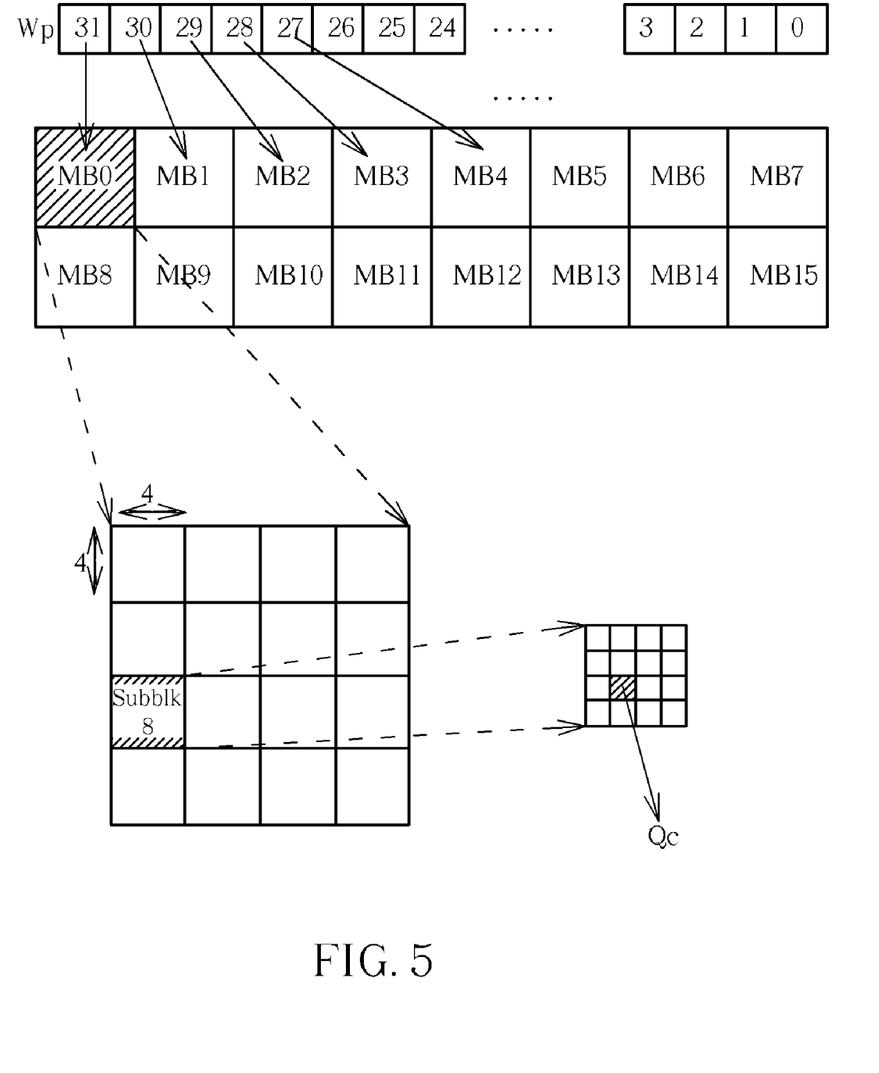
FIG. 5 is a schematic diagram illustrating the watermark bits are embedded into a specific quantization coefficient of a subblock.

FIG. 5 is a schematic diagram illustrating the watermark bits are embedded into a specific quantization coefficient of a subblock. As shown in FIG. 5, each bit of the watermark WP is embedded to a quantization coefficient Qc in a subblock of a macro block. Also, in the embodiment shown in FIG. 5, the bits of the watermark WP are embedded to at least one quantization coefficient of a diagonal line of a subblock in at least one macro block of a frame. This is because the effect to the P frame will be less if the watermark is embedded to the quantization coefficient of a diagonal line, thus the watermark can be embedded to a P frame this way. It should be noted that the above-mentioned description is only an example and is not meant to limit the scope of the present invention. The watermark can be embedded to a quantization coefficient of other locations if the watermark is not limited to be embedded to a P frame. Normally, a watermark is always embedded to an I frame, but the P frame is not certain. However, the P frame will be protected even if it does not have an embedded watermark, but an error detection thereof cannot be performed.

Figure 6:
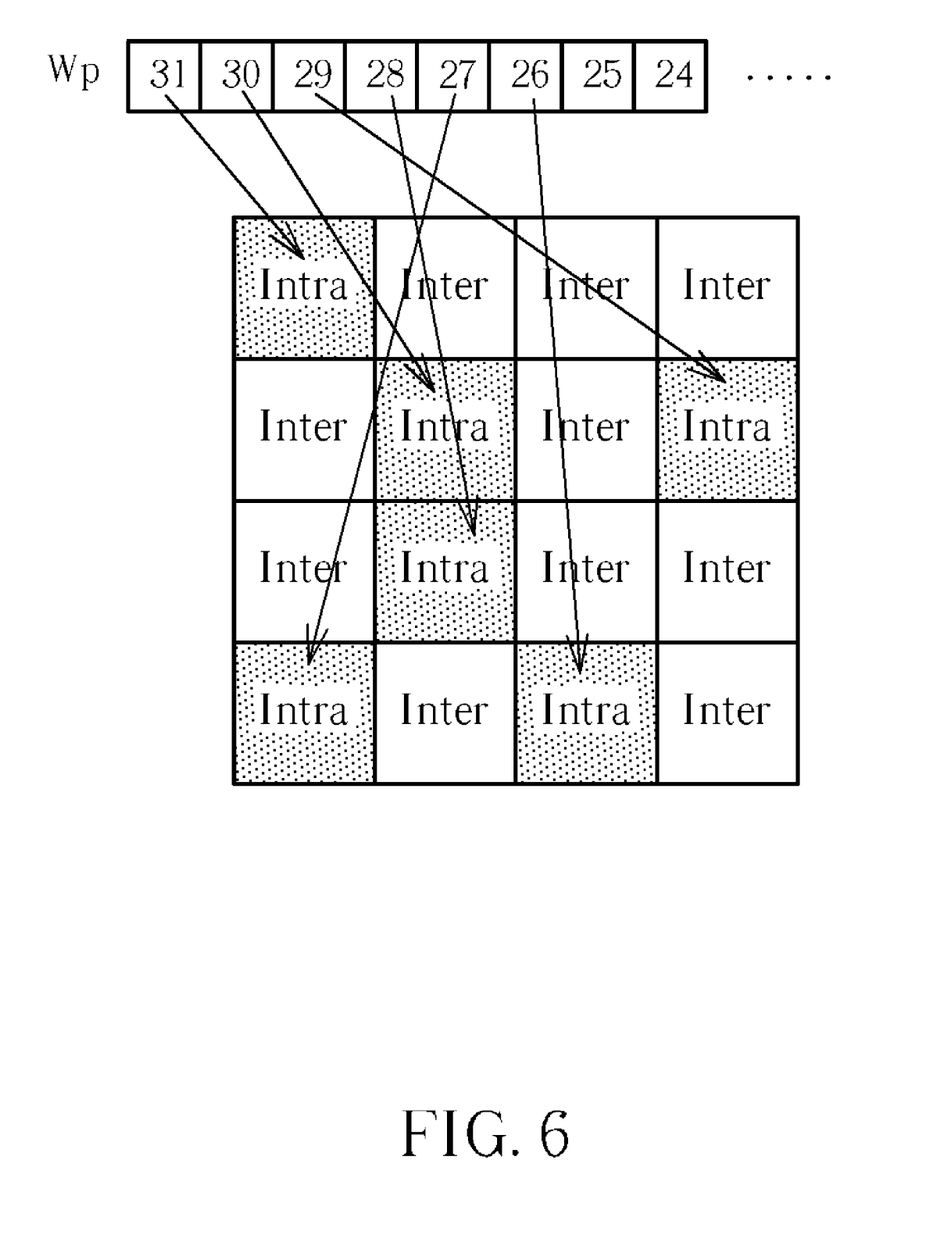
FIG. 6 and FIG. 7 are schematic diagrams illustrating the embodiments according to the present invention can embed watermark into Intra MB only or embed watermark into Intra MB and Inter MB separately.
Figure 7:
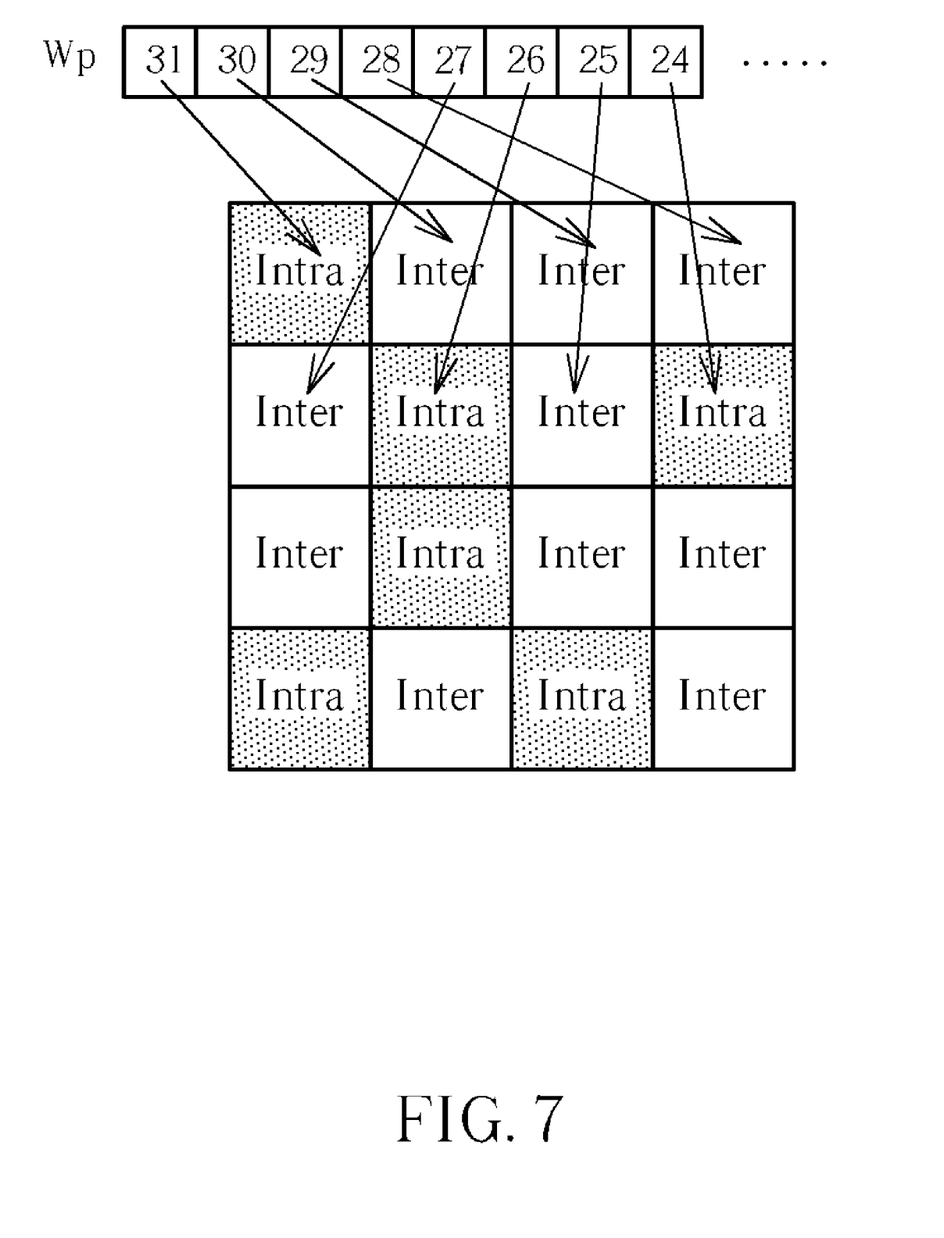

FIG. 6 and FIG. 7 are schematic diagrams illustrating the embodiments according to the present invention can embed watermark into Intra MB only or embed watermark into Intra MB and Inter MB separately. As shown in FIG. 6, the watermark generated from the present invention can only be embedded to an intra MB. Also, the watermark generated from the present invention can also be embedded to both an intra MB and an inter MB, as shown in FIG. 7. Since how to select a MB to be embedded is well known by persons skilled in the art, it is omitted for brevity here. The watermark generated according to the present invention is not limited to be embedded to every frame and can also be embedded to every two frames.

Figure 8:
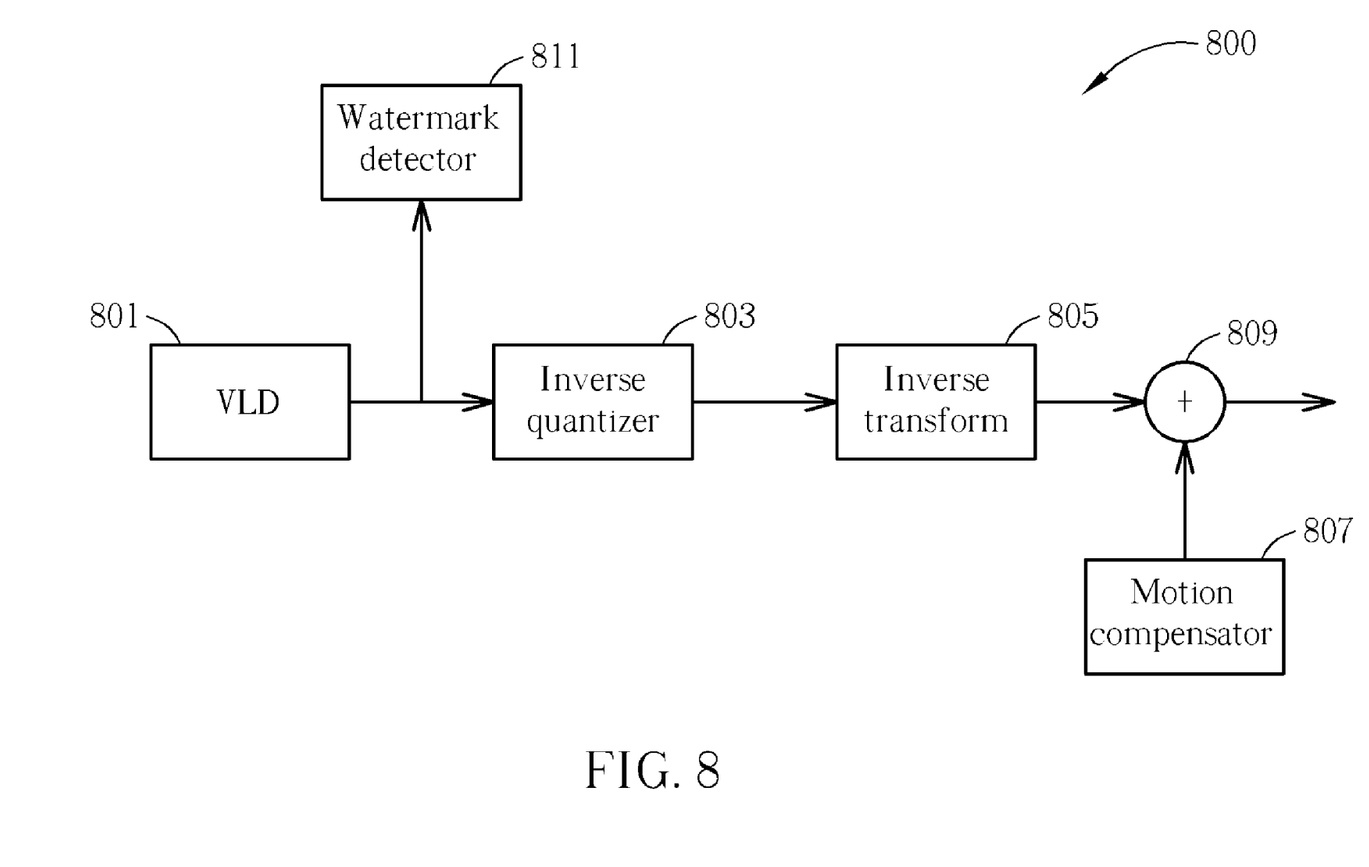
FIG. 8 is a schematic diagram illustrating a decoding system for extracting and detecting a watermark, which is extracted and detected according to the mechanism of the present invention.

FIG. 8 is a schematic diagram illustrating a decoding system 800 for extracting and detecting a watermark, which is extracted and detected according to the mechanism of the present invention. The decoding system 800 is similar to a prior art decoding system, which includes a VLD 801, an inverse quantizer 803, an inverse transform 805, a motion compensator 807, an adder 809 and a watermark detector 811. The watermark detector 811 is used for detecting a watermark. However, if the watermark detector 811 is used for detecting a watermark generated from the mechanism provided by the present invention, the watermark cannot be detected unless the initial values of the first reference signal $RS_1$ and the computing parameter CP are known, and which MB and frames are embedded, therefore the security of the image information can greatly increase. Since the method for detecting a watermark is well known by persons skilled in the art, it is omitted for brevity here.

Figure 9:
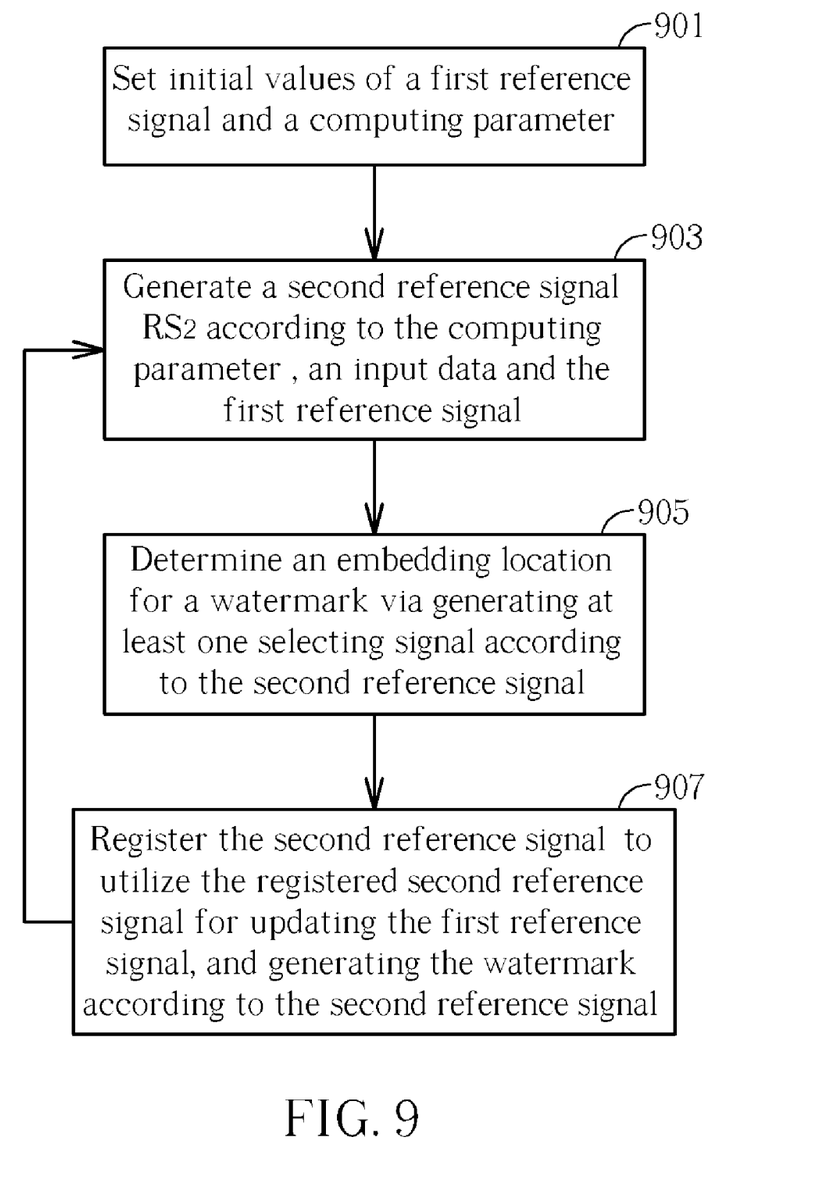
FIG. 9 is a flow chart illustrating a watermark generating method corresponding to the watermark generating circuit shown in FIG. 2.

FIG. 9 is a flow chart illustrating a watermark generating method corresponding to the watermark generating circuit shown in FIG. 2. As shown in FIG. 9, the method includes:

Step 901

Set initial values of a first reference signal $RS_1$ (CRC check sum) and a computing parameter CP (CRC coefficient).

Step 903

Generate a second reference signal $RS_2$ according to the computing parameter CP (CRC coefficient), an input data Data (bit stream) and the first reference signal $RS_1$.

Step 905

Determine an embedding location for a watermark WP via generating at least one selecting signal $SS_1$ and $SS_2$ according to the second reference signal $RS_2$.

Step 907

Register the second reference signal $RS_2$ to utilize the registered second reference signal $RS_2$ for updating the first reference signal $RS_1$, and generating the watermark WP according to the second reference signal $RS_2$. Then go back to Step 903.

Detailed technique characteristics can be obtained according to the above-mentioned figures and descriptions, and are thus omitted here.

According to the above-mentioned embodiments, a hardware circuit can be utilized to generate and embed a watermark, and can embed a watermark to a P frame without affecting the image quality. The embedding location and watermark can continuously vary according to input data, such that the watermark is not easily detected and the security of data increases.

Those skilled in the art will readily observe that numerous modifications and alterations of the device and method may be made while retaining the teachings of the invention.

What is claimed is:

1. A watermark generating circuit, comprising:
    a first computing circuit, for generating a second reference signal according to a computing parameter, an input data and a first reference signal;
    a second computing circuit, coupled to the first computing circuit, for generating at least one selecting signal to determine an embedding location for a watermark according to the second reference signal;
    a register, coupled to the first computing circuit, for registering the second reference signal to transmit the registered second reference signal to the first computing circuit for updating the first reference signal, and for generating the watermark according to the second reference signal;
    wherein the first computing circuit is a CRC (cyclic redundancy check) circuit, where the computing parameter includes a CRC coefficient, and the first, second reference signals are all CRC checksum codes.

2. The watermark generating circuit of claim 1, wherein the CRC circuit, the input data, the first reference signal and the second reference signal are all 32 bits, where a part of bits of the cyclic redundancy check circuit is controlled by the computing parameters to determine the operations of the CRC circuit, and the CRC circuit determines which part of the input data is used to generate the second reference signal according to the part of bits of the first reference signal.

3. The watermark generating circuit of claim 2, wherein the CRC circuit determines which part of the input data is used to generate the second reference signal according to the $28^{th}$ to $32^{nd}$ bits of the first reference signal.

4. The watermark generating circuit of claim 1, utilized for a video encoder, wherein the input data is a bit stream from a variable length encoder.

5. The watermark generating circuit of claim 4, wherein the second reference signal continuously varies according to the bit stream, and the register outputs a last registered second reference signal to the first computing circuit for updating the first reference signal after the watermark is embedded to a corresponding frame.

6. The watermark generating circuit of claim 1, wherein the second computing circuit generates a first selecting signal and a second selecting signal to determine the location of watermark embedding, where the first selecting signal determines that the watermark is embedded to a specific subblock of at least one macro block in a frame, and the second selecting signal determines that the watermark is embedded to a specific quantization efficient of the specific subblock.

7. The watermark generating circuit of claim 6, wherein the second reference signal is a 32 bit signal, and the first selecting signal is determined according to the $24^{th}$ to $27^{th}$ bits of the second reference signal.

8. The watermark generating circuit of claim 6, wherein the second reference signal is a 32 bit signal, and the second selecting signal is determined according to the $22^{nd}$ to $23^{rd}$ bits of the second reference signal.

9. The watermark generating circuit of claim 1, wherein the watermark is embedded to a quantization coefficient of a diagonal line of a subblock in at least one macro block of a frame.

10. A watermark generating method, comprising:
   (a) setting initial values of a first reference signal and a computing parameter;
   (b) generating a second reference signal according to the computing parameter, an input data and the first reference signal;
   (c) determining an embedding location for a watermark via generating at least one selecting signal according to the second reference signal;
   (d) registering the second reference signal to utilize the registered second reference signal for updating the first reference signal, and generating the watermark according to the second reference signal; and
   wherein step (b) is implemented by a CRC (Cyclic Redundancy Check) circuit and the computing parameter comprises a CRC coefficient, and the first, second reference signals are all CRC checksums.

11. The watermark generating method of claim 10, wherein the CRC circuit, the input data, the first reference signal and the second reference signal are all 32 bits, where a part of bits of the cyclic redundancy check circuit is controlled by the computing parameters to determine the operations of the CRC circuit, and the CRC circuit determines which part of the input data is used to generate the second reference signal according to the part of bits of the first reference signal.

12. The watermark generating method of claim 11, wherein the CRC circuit determines which part of the input data is used to generate the second reference signal according to the $28^{th}$ to $32^{nd}$ bits of the first reference signal.

13. The watermark generating method of claim 10, utilized for a video encoder, wherein the input data is a bit stream from a variable length encoder.

14. The watermark generating method of claim 13, wherein the second reference signal continuously varies according to the bit stream, and the register outputs a last registered second reference signal to the first computing circuit for updating the first reference signal after the watermark is embedded to a corresponding frame.

15. The watermark generating method of claim 10, wherein the step (c) generates a first selecting signal and a second selecting signal to determine the location of watermark embedding, where the first selecting signal determines that the watermark is embedded to a specific subblock of at least one macro block in a frame, and the second selecting signal determines that the watermark is embedded to a specific quantization efficient of the specific subblock.

16. The watermark generating method of claim 15, wherein the second reference signal is a 32 bit signal, and the first selecting signal is determined according to the $24^{th}$ to $27^{th}$ bits of the second reference signal.

17. The watermark generating method of claim 15, wherein the second reference signal is a 32 bit signal, and the second selecting signal is determined according to the $22^{nd}$ to $23^{rd}$ bits of the second reference signal.

18. The watermark generating method of claim 10, wherein the watermark is embedded to a quantization efficient of a diagonal line of a subblock in at least one macro block of a frame.

* * * * *